Patented Mar. 1, 1938

2,109,911

UNITED STATES PATENT OFFICE 2,109,911

PROCESS FOR THE MANUFACTURE OF A PRODUCT SIMULATING LEATHER

Fernand Frederic Schwartz, Paris, France, assignor, by mesne assignments, to Cela Holding S. A., Paris, France, a corporation of Luxembourg No Drawing. Application August 10, 1935, Serial No. 35,669. In France October 18, 1934

3 Claims. (Cl. 91—68)

Rubber gives to the touch a sensation of adherence which is not agreeable and which, for certain applications, prevents or at least limits its use. It has been attempted for a long time to remedy this disadvantage and to give to rubber or to fabrics impregnated with rubber a better "feel" and in particular a "feel" resembling that of leather. The problem was difficult to solve, for if a solution were sought by increasing the fillers in the rubber, this latter became fragile and all the qualities for which it was appreciated disappeared.

On the other hand, it was not possible to achieve good results by covering the surface of the rubber or of rubberized fabrics with varnishes or other finishing products because the coefficients of expansion, of elasticity, and the natural properties of the surface of the rubber created a repulsion of this latter with respect to all bodies differing from it by their composition.

In the same way the belief that the results sought would be obtained by the application of chlorinated rubber did not correspond to actual facts, all hopes founded upon this process were falsified.

To sum up, it has been impossible up to now to obtain upon rubber a soft and smooth surface which did not cling, in particular to garments and other textile products.

The present invention has for its object a process which permits conferring upon articles with a basis of vulcanized rubber latex, such as fabrics impregnated with rubber latex and vulcanized, a surface perfectly analogous to that of leather, without altering their properties of being both yielding and resistant. This process consists in subjecting the articles previously vulcanized to the action of a sulphur chloride dissolved in a neutral solvent such for example as a cyclic or aliphatic hydrocarbon, and in decomposing the sulphur chloride on the articles by the action of air then by the action of water. The chlorine which is formed due to the decomposition of the sulphur chloride in contact with the air is partly absorbed by the rubber and partly transformed by the subsequent treatment by the water into hydrochloric acid and hypochlorous acid, the latter decomposing into hydrochloric acid and oxygen. This reaction transforms the vulcanized rubber latex articles in such a way that they are deprived of their thermo-plastic properties.

The present process is applicable to latex in all its forms whether pure or associated with fillers or textiles, or whether it is in the form of products intended for the constitution of articles or whether it concerns articles in their final form.

The latex thus transformed taken alone or in its associations with other bodies, notably with textiles, is a new body. Its consistency and its "feel" resemble those of leather. Its surface no longer clings to textiles, and above all it is receptive of all the finishes usual in the leather industry, such as albumen and pigments with a basis of casein; all sorts of varnishes, pigments with a basis of nitrocellulose, boiled linseed oil etc. adhere strongly to the surface of the new body without scaling.

As an example of the preparation of this new product and solely by way of a practical demonstration of the process without limitation as to proportions nor as to the time necessary, the following preparation may be quoted.

A fabric impregnated with a bath of latex containing all the elements producing and accelerating vulcanization, and vulcanized in the ordinary way, is plunged for 20 seconds into a solution of 10% sulphur protochloride in benzole. This fabric is allowed then to remain in the open air for about one to two minutes and immediately afterwards it is plunged into water in which it remains for several hours after which it is removed from the water and dried. It then shows the appearance of leather and has the "feel" thereof.

I claim:

1. A process for the manufacture of a product simulating leather, which consists in treating a sheet material containing vulcanized rubber latex by a sulphur chloride dissolved in a neutral solvent, and in decomposing the sulphur chloride on the material first by the action of air and then by the action of water, the treatment with water being continued for several hours.

2. A process for the manufacture of a product simulating leather, which consists in treating a sheet material containing vulcanized rubber latex by a sulphur chloride dissolved in a neutral solvent and in exposing the sheet material in the open air for a few minutes then immediately immersing the said sheet material in water, the treatment with water being continued for several hours.

3. A process for the manufacture of a product simulating leather, which consists in impregnating a fabric with rubber latex, vulcanizing the impregnated fabric, treating the impregnated and vulcanized fabric by a sulphur chloride dissolved in a neutral solvent and exposing the said fabric in the open air for a few minutes then immediately immersing the said fabric in water, the treatment with water being continued for several hours.

FERNAND FREDERIC SCHWARTZ.